UNITED STATES PATENT OFFICE.

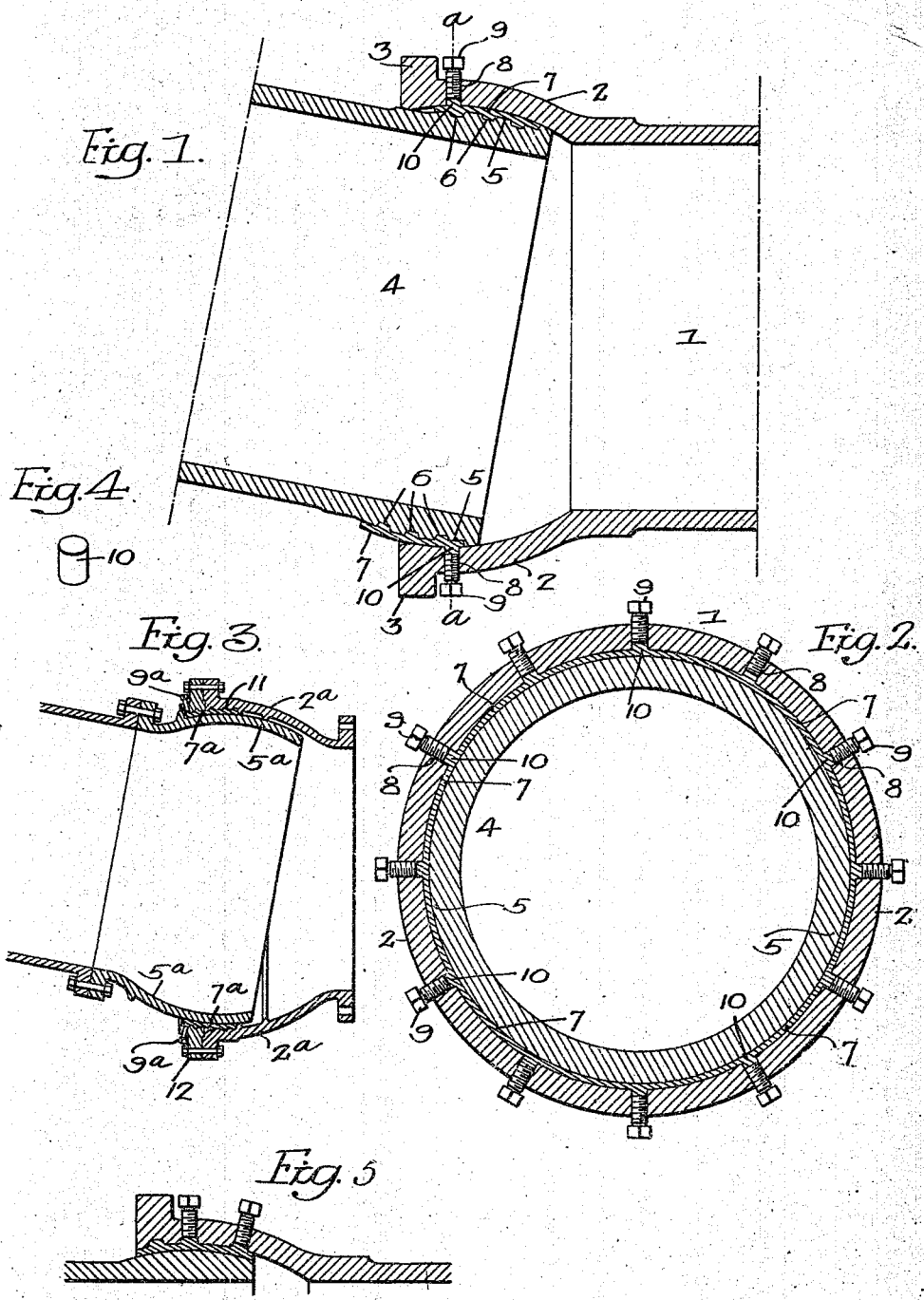

JAMES HURON WOOD, OF HADDONFIELD, NEW JERSEY, ASSIGNOR TO CAMDEN IRON WORKS, OF CAMDEN, NEW JERSEY, A CORPORATION OF NEW JERSEY.

FLEXIBLE PIPE-JOINT.

1,179,594.   Specification of Letters Patent.   Patented Apr. 18, 1916.

Application filed May 5, 1913. Serial No. 765,648.

*To all whom it may concern:*

Be it known that I, JAMES H. WOOD, a citizen of the United States, residing in Haddonfield, county of Camden, State of New Jersey, have invented certain Improvements in Flexible Pipe-Joints, of which the following is a specification.

The object of my invention is to make a water tight joint between two pipes which are flexibly connected. This object I attain in the following manner, reference being had to the accompanying drawings, in which:

Figure 1 is a longitudinal sectional view of two pipes coupled together and illustrating my invention; Fig. 2 is a sectional view on the line $a$—$a$, Fig. 1; Fig. 3 is a view illustrating a modification of the invention; Fig. 4 is a view of the plug; and Fig. 5 is a view of a modification of the invention.

Referring to the drawings, 1 is one pipe having a bell end 2 and a flange 3, in the present instance.

4 is another pipe having a spigot or ball end 5 fitting in the bell end 2 of the first mentioned pipe. In the ball end 5 is a series of annular grooves 6 of any shape or number desired and 7 is a soft metal ring having ribs extending into the grooves. This ring is usually made of lead, or other suitable material, which would form a water tight joint between the two pipes.

This construction is now commonly used in making flexible joint pipes and the only means provided at the present time to prevent leakage is that of calking the lead joint from the outside. This, however, is not effective in many instances, especially where the water passing through the pipe is under high pressure.

I find that by forcing additional metal into the space between the bell end of one pipe and the ball end of the other pipe, I can make a substantially tight joint. This is accomplished in the following manner: 8—8 are a series of radial holes in the bell end of the pipe, in the present instance, which are threaded and mounted in the threaded openings are screw threaded plungers 9 having heads adapted to receive a suitable tool so that they can be turned. Plugs 10 of lead, or other suitable material, Fig. 4, are placed in the holes 8 and on turning the screws 9 the metal of the plug is caused to flow and incorporate with the metal of the annular ring 7, filling any crevices between the ball and the bell and preventing the escape of water through the joint. If one pipe is turned in respect to the other after the lead plugs have been forced into the ring, the portion of the plug remaining in the opening 8 is cut off from the ring on the movement of the pipes. If one inserted in each hole is not sufficient to make a tight joint, then the screw can be removed and another lead plug 10 inserted in the hole and the screw reinserted and driven in the opening until the joint is tight.

In Fig. 3 I have illustrated another form of my coupling in which the ring $7^a$ has tongues adapted to grooves 11 in the bell end $2^a$ of the pipe. The ball end $5^a$ of the other pipe is smooth so as to turn in the ring. In this instance, I have shown an extension 12 of the bell end to which is also attached the annular soft metal ring $7^a$ and in this instance the extension has a series of radial holes in which are the screws $9^a$. In this case, the plugs are placed in the holes and the screws are turned so as to force the metal of the plugs into the ring, but as the ring is attached to the bell the extensions of the plug are not cut from the ring when one pipe turns in the other.

In Fig. 3, I have shown the ball and bell of short sections which form a knuckle joint and these sections are finished to be bolted on to standard sizes of flanged pipe, but it will be understood that the ball and bell may be formed integral with the pipes, or may be made separate and attached thereto by any suitable fastenings.

In Fig. 5, I have illustrated a modification in which there are two annular series of openings so that where the surface is extended a series of plugs can be inserted at different points.

I claim:

1. The combination of two pipes, one having a bell end and the other having a ball end adapted to the bell; a broad soft metal packing ring mounted between the two parts and secured to one of said parts; a series of radial holes in the bell end and spaced apart; screws mounted in the holes; and soft metal plugs mounted in the holes between the ring and the screws so that on turning the screws, the soft metal plugs will be caused to flow into the ring.

2. The combination in a flexible joint for pipes, of two pipes, one pipe having a bell end and the other having a ball end mounted in the bell end, the ball end having a series of annular grooves in the periphery thereof; a broad soft metal ring between the bell end and the ball end of the pipes and having tongues extending into the grooves of the ball end; the bell end of the pipe having a series of radial holes extending therethrough and communicating with the space occupied by the soft metal ring; soft metal plugs in said holes; and screws mounted in the holes which, when turned, will cause the metal of the plugs to be forced into the soft metal ring to make a water tight joint.

3. The combination in a flexible joint for pipes, of one pipe having a bell and another pipe having a ball adapted to the bell; a soft metal packing ring located between the ball and bell and secured to one of said parts so as to turn therewith; the other part having openings communicating with the space between the ball and bell for the insertion of soft metal; and means for forcing the metal from the openings into the said space between the pipes, the metal of the ring being sheared from the metal of the openings when one pipe is turned in respect to the other.

4. The combination in a flexible joint for pipes, of one pipe having a bell end and the other having a ball end adapted to the bell, said ball end having grooves therein; a broad soft metal ring having tongues extending into the grooves so that the ring will turn with the ball; the bell end having a series of radial threaded holes therein communicating with the space occupied by the soft metal ring; screws adapted to the holes; and plugs of soft metal located in the holes in front of the screws, the holes being spaced at such a distance apart that, when the screws are turned, a portion of the metal of the plugs will be incorporated with the metal of the ring and the entire ring will tightly fit between the ball and the bell and, when one pipe is turned in respect to the other, the portions of the plugs remaining in the holes will be severed from the ring.

In testimony whereof, I have signed my name to this specification, in the presence of two subscribing witnesses.

JAMES HURON WOOD.

Witnesses:
WM. E. SHUPE,
WM. A. BARR.